United States Patent [19]
Kobayashi

[11] Patent Number: 4,518,056
[45] Date of Patent: May 21, 1985

[54] SNOWMOBILE

[75] Inventor: Takashi Kobayashi, Hamamatsu, Japan

[73] Assignee: Yamaha Hatsudoki Kabushiki Kaisha, Japan

[21] Appl. No.: 403,064

[22] Filed: Jul. 29, 1982

[30] Foreign Application Priority Data

Aug. 11, 1981 [JP] Japan ................. 56-124799

[51] Int. Cl.³ .............................................. B62D 55/08
[52] U.S. Cl. ..................... 180/193; 180/190
[58] Field of Search ............. 180/193, 190, 9.5, 9.54, 180/9.56; 305/16, 24, 25, 60

[56] References Cited

U.S. PATENT DOCUMENTS

| 3,913,694 | 10/1975 | Forsgren | 180/193 |
| 3,933,213 | 1/1976 | Trowbridge | 180/193 |
| 4,093,033 | 6/1978 | Rosch | 180/9.56 |
| 4,222,453 | 9/1980 | Fixsen et al. | 180/193 |

Primary Examiner—Joseph F. Peters, Jr.
Assistant Examiner—Donn McGiehan
Attorney, Agent, or Firm—Ernest A. Beutler

[57] ABSTRACT

A snowmobile construction comprising a body frame having a slide rail suspended from the body frame through front and rear suspensions, and an endless track which runs under tension upon a drive pulley rotatably borne on the body frame. The driven pulley is rotatably borne on the slide rail, with the slide rail, the front rear suspensions connecting the body frame and the slide rail through link mechanisms, respectively. Compression coil springs and shock absorbers are held between links adapted to shift in directions opposite to each other. As a result, the present invention has the effect that vehicle safety and riding comfortability of the driver is ensured for a changing, wide range of undulations of a snow surface.

5 Claims, 3 Drawing Figures

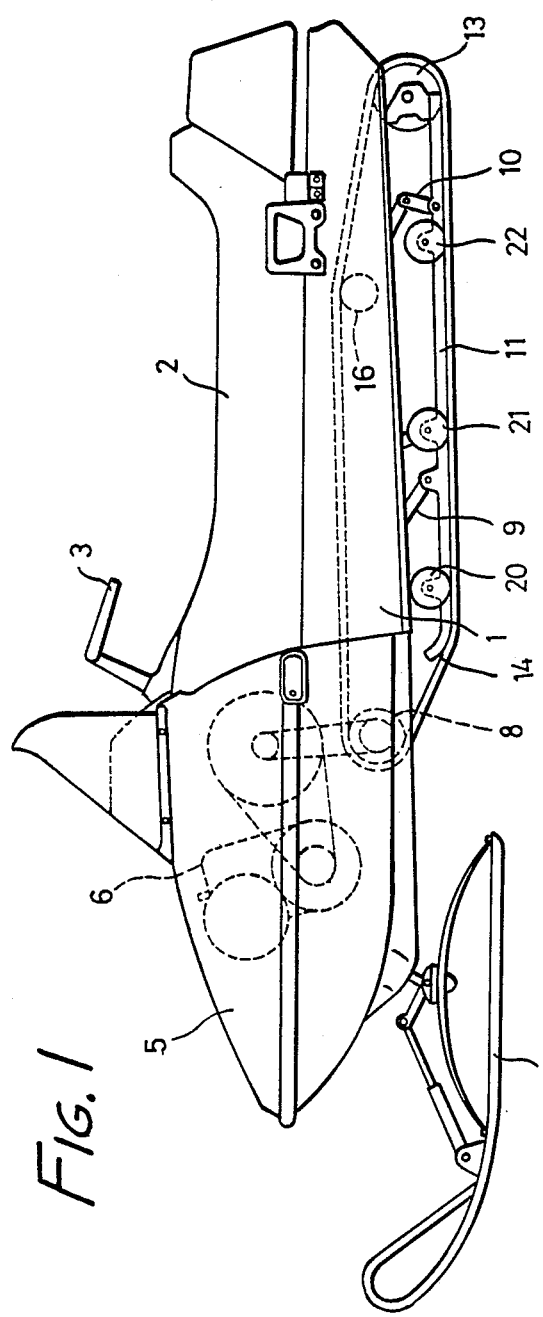
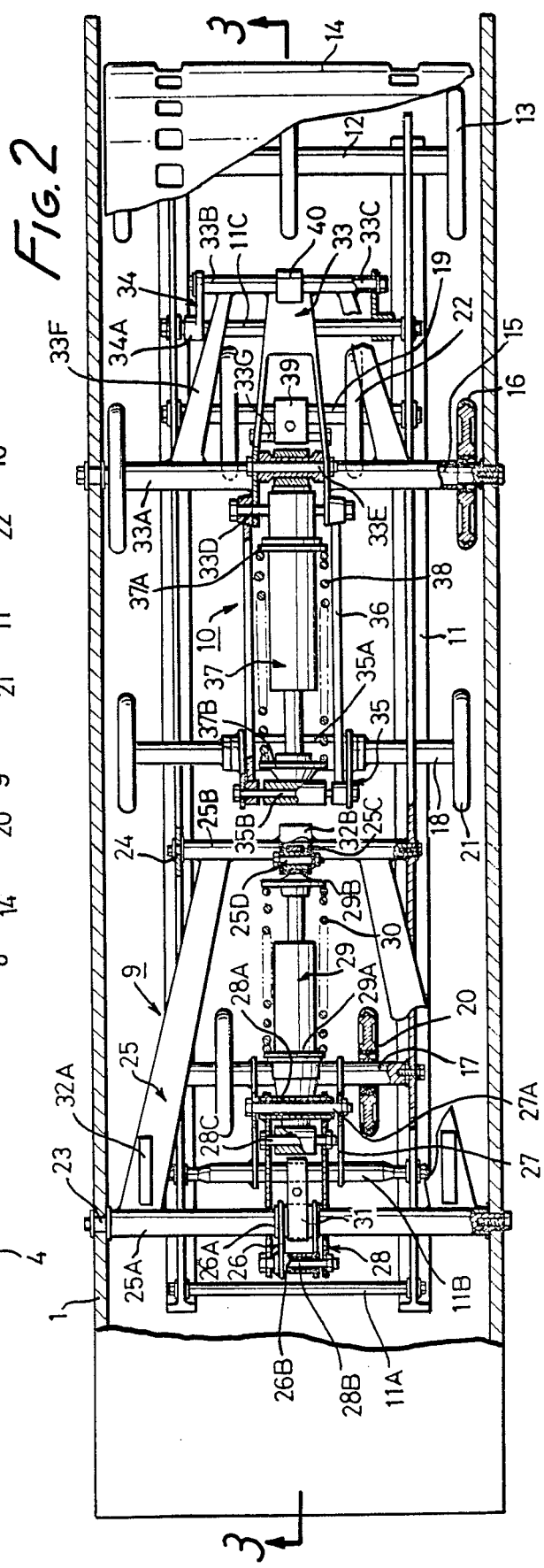

SNOWMOBILE

FIELD OF THE INVENTION

The present invention relates to a snowmobile.

BACKGROUND OF THE INVENTION

Generally speaking, a snowmobile is constructed such that a slide rail is suspended from a body frame through a suspension so that an endless track runs under tension upon a drive pulley rotatably borne on the body frame and upon a driven pulley rotatably borne on the slide rail, and upon the slide rail, whereby driving power can be transmitted from the endless track to the snow surface. Here, the suspension interposed between the body frame and the slide rail is equipped to absorb vibrations which are generated by the undulations of the snow surface, and to force the endless track to follow the snow surface, thereby to ensure the snow surface drive.

However, snowmobile suspensions of the prior art use a torsion spring for a shock absorber, thereby to invite a problem that the shocks to the vehicle and its driver cannot be sufficiently absorbed in case a shock-absorbing stroke is relatively small and the undulations of the snow surface are high.

Therefore, the present invention has been conceived in view of the aforementioned problem of the prior art, and has an object to provide a snowmobile which is equipped with a suspension that it is made properly responsive to wide change in the undulations of a snow surface thereby to ensure the safety of the vehicle and the riding comfortability of the driver.

BRIEF DESCRIPTION OF THE INVENTION

In order to achieve the aforementioned object, according to the present invention, there is provided a snowmobile which comprises a body frame, a slide rail suspended from said body frame through front and rear suspensions, and an endless track made to run under tension upon a drive pulley rotatably borne on said body frame, a driven pulley rotatably borne on said slide rail, and slide rail. The invention is characterized in that said front and rear suspensions connect said body frame and said slide rail through link mechanisms, respectively; and in that compression coil springs and shock absorbers are held between links adapted to shift in opposite directions to each other.

The present invention will be described in the following in connection with the embodiment thereof with reference to the accompanying drawings, in which:

BRIEF DESCRIPTION OF THE DRAWINGS

FIG. 1 is a side elevation showing one embodiment of a snowmobile according to the present invention;

FIG. 2 is a top plan view showing the whole construction of suspension of the same snowmobile.

DETAILED DESCRIPTION OF THE INVENTION

Figure 3:
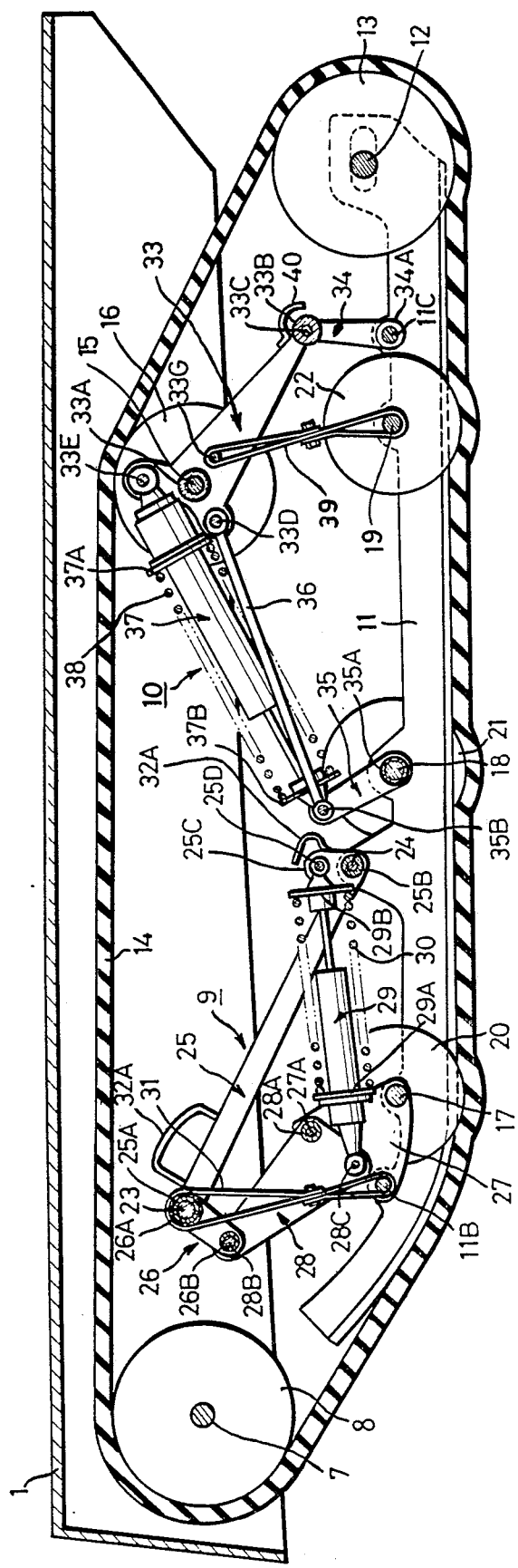
FIG. 3 is a section taken along line III—III in FIG. 2.

On the center portion of a body frame 1, there is mounted a driver's seat 2. At that center portion, there is disposed a steering handle 3. A steering ski 4 is arranged below the front end of body frame 1. At the front portion of body frame 1 there is mounted an engine 6 in an engine space, which is covered with a shroud 5, so that the output power of the engine 6 can be transmitted through a reduction to a drive pulley 8 rotatably supported on a shaft 7 laid on body frame 1.

A slide rail 11 is so suspended from the lower side of body frame 1 through a front suspension 9 and a rear suspension 10 that it can move up and down relative to body frame 1. Slide rail 11 is composed of a pair of right and left rail members which are jointed to each other by means of connecting members 11A, 11B and 11C or the like. A driven pulley 13 is rotatably borne on the rear end portion of slide rail 11 through a shaft 12. An endless track 14 is made to run under tension upon drive pulley 8 rotatably borne on body frame 1, upon driven pulley 13 rotatably driven on slide rail 11, and upon slide rail 11 that its lower running portion if forced into contact with the snow surface through slide rail 11. Incidentally, the upper running portion of endless tract 14 is supported by an upper supporting pulley 16 which is rotatably borne through a bearing on a shaft 15 laid in body frame 1. On the other hand, the lower running portion of endless track 14 can have its inner side supported on lower supporting pulleys 20, 21 and 22 which are rotatably supported through respective bearings on shafts 17, 18 and 19 laid in slide rail 11.

The aforementioned front suspension 9 is made to have the construction described in the following. Specifically, pipes 25A and 25B at one and the other ends of a main link 25 are rotatably connected, respectively, to a shaft 23, which is laid in the front portion of body frame 1, and to a shaft 24 which is laid in slide rail 11. With pipe 25B, there is integrated an extension 25C, on which a pin 25D disposed above pipe 25B is arranged. To the center portion of pipe 25A of main link 25, there is rotatably connected a pipe 26A which is located at one end side of an intermediate link 26. The other end side of intermediate link 26 is formed with a pipe 26B. To the connecting member 11B and shaft 17 which are laid in slide rail 11, there is fixed a bracket 27 on which a pin 27A is supported. To pin 27A supported on the bracket 27, there is rotatably connected a pipe 28A of a connecting link 28 which has a triangular shape. On connecting link 28, there are supported pins 28B, 28C which are positioned above and below pipe 28A. Pipe 26B of intermediate link 26 is rotatably connected to pin 28B of connecting link 28, whereas the cylinder side base end portion of a shock absorber 29 is rotatably connected to pin 28C of connecting link 28. The leading end portion of shock absorber 29 at the side of the piston rod is rotatably connected to pin 25D which is supported on extension 25C of main link 25. A compression coil spring 30 is held between a flange 29A, which is integrated with the cylinder side of shock absorber 29, and a retainer 29B which is integrated with the piston rod side of the same.

In front suspension 9 thus constructed, more specifically, main link 25, intermediate link 26, connecting link 28 and slide rail 11 constitute a link mechanism, and shock absorber 29 and compression coil spring 30 are held between pin 25D of main link 25 and pin 28C of connecting link 28. As a result, in the snowmobile equipped with front suspension 9 as thus far described, in case slide rail 11 abruptly moves up and down, as in the running operation on an undulating snow surface, pin 25D of main link 25 and pin 28C of connecting link 28 move in opposite directions to leave or to approach each other so that compression coil spring 30 can be compressed to absorb the shocks or extended to return slide rail 11 into such a normal position as to follow the snow surface and so that the vibrations of compression coil spring 30 are restricted or absorbed by the oil damper effect of shock absorber 29. Moreover, on both pipe 16A of intermediate link 26, which is fitted on shaft 23 laid in body frame 1, and connecting member 11B laid in slide rail 11, there is mounted a regulating band 31 having a predetermined length, made operative to restrict the maximum spacing range between the body frame 1 and the slide rail 11 at the extension side of the compression coil spring 30 thereby preventing the suspension from becoming inoperative to the extent that the snowmobile is jumping in the air. To the upper side of the main link 25, there are attached guide plates 32A and 32B, brought into abutting contact with the inner side of endless track 14, when the slide rail 11 moves increasingly upward with respect to the body frame 1, thereby making it possible to prevent endless track 14 from interfering with respective links or the like.

The rear suspension 10 has a construction as will be described in the following. To shaft 15 laid in body frame 1, a pipe 33A is rotatably connected and disposed at the center portion of a main link 33. This main link 33 is equipped with a pipe 33B, a pin 33D and a pin 33E, which extend in three radial directions generally about the pipe 33A. Incidentally, a reinforcing member 33F is arranged between pipes 33A and 33B of main link 33. A connecting link 34 has one end rotatably connected to the pipe 33B of the main link 33 through a pin 33C and the other end 34A rotatably connected to connecting member 11C laid in the slide rail 11. A connecting link 35 has one end pipe 35A rotatably connected to the center portion of shaft 18, laid in the slide rail 11, and the other end supporting a pin 35B. The pin 33D of main link 33 and pin 35B of connecting link 35 are connected by means of an intermediate rod 36 so that connecting link 35 can swing clockwise about shaft 18 in case main link 33 swings counter-clockwise about shaft 15. A shock absorber 37 has its cylinder side base end portion rotatably connected to pin 33E of main link 33 and its piston rod side leading end portion rotatably connected to pin 35B of connecting link 35. A compression coil spring 38 is held between a flange 37A, integrated with cylinder side of the shock absorber 37, and a retainer 37B which is integrated with the piston rod side of the same.

In rear suspension 10 thus constructed, specifically, main link 33, connecting links 34 and 35, intermediate rod 36 and slide rail 11 constitute a link mechanism, and shock absorber 37 and compression coil spring 38 are held between pin 33E of main link 33 and pin 35B of connecting link 35. As a result, in the snowmobile equipped with the rear suspension thus far described, in case slide rail 11 abruptly moves up and down, pin 33E of the main link 33 and pin 35B of connecting link 35 move in opposite directions to leave or approach each other so that compression coil spring 38 can be compressed to absorb shocks or extended to return the slide rail into such a normal position as to follow the snow surface so that vibrations of the compression coil spring 38 can be restricted or absorbed by the oil damper effect of shock absorber 37. Moreover, between pin 33G fitted in the main link 33 and shaft 19 rotatably borne on slide rail 11, there is mounted a regulating band 39 made operative to restrict the maximum spacing range between body frame 1 and slide rail 11 at the extension side of compression coil spring 38. Furthermore, a guide plate 40 is attached to main link 33 thereby making it possible to prevent endless track 14 from interfering with the respective links of the suspension, or the like, while slide rail 11 is moving upward.

Next, the operations of the snowmobile constructed according to the aforementioned embodiment will be described in the following. If the slide rail 11 abruptly moves up as in a case when the snowmobile runs over a mound, pin 25D of main link 35 and pin 38C of connecting link 28 at front suspension 9 approach each other to compress compression coil spring 30, and pin 33E of main link 33 and pin 35B of connecting link 35 at the rear suspension 10 approach each other to compress compression coil spring 38 so that vibrations generated by the undulations on the snow surface can be absorbed through compressions of compression coil springs 30 and 39. The compression coil springs 30 and 38 thus compressed are then extended to move slide rail 11 downward so that endless track 14 is permitted to promptly follow the snow surface thereby to effect the snow surface drive. Incidentally, respective shock absorbers 29 and 37 of front and rear suspensions 9 and 10 can have their oil damper effect restrain and absorb the vertical vibrations of compression coil springs 30 and 38.

According to the snowmobile construction of the aforementioned embodiment, since front and rear suspensions 9 and 10 are equipped with compression coil springs 30 and 38, respectively, a large shock-absorbing stroke can be ensured so that the shocks exerted upon the vehicle or its driver can be sufficiently reduced in case undulations of the snow surface are large. Moreover, since both ends of the shock absorber 29 and the compression coil spring 30 constituting front suspension 9 are supported on pin 25D of main link 35 and on pin 28C of connecting link 28 so that pins 25D and 28C are shifted in directions opposite to each other when in the shock absorbing operation, the shock absorbing force of shock absorber 29 and spring reaction of compression coil spring 30 can be effectively exerted upon both main link 25 and connecting link 28. As a result, the size of shock absorber 29 and compression spring 30 can be reduced, and no high load is exerted during shock absorbing operation upon body frame 1 and slide rail 11. Furthermore, shock absorber 37 and compression coil spring 38 constituting rear suspension 10 have both their ends supported on pin 33E of main link 33 and pin 35B of connecting link 35 and since pins 33E and 35B are shifted during the shock absorbing operation in the directions opposite to each other, the shock absorbing force of shock absorber 37 and spring reaction of compression coil spring 38 can be effectively exerted upon both main link 33 and connecting link 35 so that the size of shock absorber 37 and compression coil spring 38 can be reduced so that no high load is exerted during shock absorbing operation upon body frame 1 and slide rail 11.

I claim:

1. A suspension system for a snowmobile comprising a body frame, a slide rail, front and rear suspension means securing said slide rail to said body frame for movement relative thereto, an endless track arranged and disposed to run on a driven roller mounted on said slide rail and a drive pulley mounted on said body frame, said front and rear suspension means comprising link means connecting said side rail to said body frame, and shock absorbing means connected between portions of said link means which pivot in directions opposite to one another whereby said shock absorber is extended or compressed when said link means pivots, at least one of said shock absorber means comprising a tubular shock absorber having its opposite ends operatively supported by said side rail, said link means being operative to effect movement of each of said shock absorber means ends toward the other upon movement of said slide rail toward said body frame.

2. A suspension system as described in claim 1 wherein the tubular shock absorber is disposed in a substantially horizontal position.

3. A suspension system as described in claim 2 wherein the link means includes a link having a pivotal connection at one point to the slide rail, a pivotal connection at another point to one end of the tubular shock absorber and a third pivotal connection operative to effect pivotal movement of said link about its pivotal connection to said slide rail upon movement of said slide rail relative to the body frame.

4. A suspension system as described in claim 3 wherein the means for effecting pivotal movement of the one link comprises a further link having a pivotal connection at one end thereof to the one link, a pivotal connection at a spaced point to the body frame and a pivotal connection at another point thereon to the slide rail.

5. A suspension system for a snowmobile comprising a body frame, a slide rail, front and rear suspension means securing said slide rail to said body frame for movement relative thereto, an endless track arranged and disposed to run on a driven roller mounted on said slide rail and a drive pulley mounted on said body frame, said front and rear suspension means comprising link means connecting said side rail to said body frame, said link means comprising a first link pivotally supported upon the body frame, said shock absorbing means having one end thereof pivotally connected to said first link at a point spaced from said first link's pivotal axis, a second link pivotally connected to said guide rail at one end thereof and having its other end pivotally connected to the opposite end of said shock absorber, a third link pivotally connected at one end thereof to said other end of said second link and at the other end thereof to said first link at a point spaced from its pivotal axis and from the pivotal connection of said first link to said one end of said shock absorber, and a fourth link pivotally connected at one end thereof to said guide rail and at the other end thereof to said first link at a point spaced from its other pivotal connections.

* * * * *